(12) United States Patent
Ohmi et al.

(10) Patent No.: US 8,562,320 B2
(45) Date of Patent: Oct. 22, 2013

(54) RESIN MOLDING DEVICE

(75) Inventors: Tadahiro Ohmi, Miyagi (JP); Yasuyuki Shirai, Miyagi (JP); Jiro Yamanaka, Miyagi (JP); Kengo Iwahara, Kanagawa (JP); Kouji Fukae, Kanagawa (JP)

(73) Assignees: National University Corporation Tohoku University, Miyagi (JP); Nichias Corporation, Tokyo (JP)

( * ) Notice: Subject to any disclaimer, the term of this patent is extended or adjusted under 35 U.S.C. 154(b) by 581 days.

(21) Appl. No.: 12/450,341

(22) PCT Filed: Mar. 18, 2008

(86) PCT No.: PCT/JP2008/054925
§ 371 (c)(1),
(2), (4) Date: Sep. 22, 2009

(87) PCT Pub. No.: WO2008/123052
PCT Pub. Date: Oct. 16, 2008

(65) Prior Publication Data
US 2010/0119642 A1    May 13, 2010

(30) Foreign Application Priority Data
Mar. 28, 2007    (JP) ................... 2007-084184

(51) Int. Cl.
*B29C 47/06*    (2006.01)
*B29C 47/20*    (2006.01)
*B29C 47/88*    (2006.01)

(52) U.S. Cl.
USPC ....... 425/72.1; 425/133.1; 425/380; 425/461; 425/467

(58) Field of Classification Search
USPC ........... 425/72.1, 133.1, 380, 461, 467, 379.1
See application file for complete search history.

(56) References Cited

U.S. PATENT DOCUMENTS

| | | | |
|---|---|---|---|
| 3,026,564 A * | 3/1962 | Kohlwey | 425/379.1 |
| 3,642,394 A * | 2/1972 | Geil | 425/72.1 |
| 4,149,839 A * | 4/1979 | Iwawaki et al. | 425/133.1 |
| 4,159,889 A * | 7/1979 | Yagi et al. | 425/71 |
| 4,812,267 A * | 3/1989 | Hoffmann et al. | 264/169 |
| 5,945,048 A * | 8/1999 | Ensinger | 264/46.1 |
| 6,214,283 B1 | 4/2001 | Visscher et al. | |
| 6,485,283 B1 * | 11/2002 | Yamaguchi et al. | 425/72.1 |
| 6,713,004 B2 | 3/2004 | Maekawa et al. | |
| 2005/0062191 A1* | 3/2005 | Kurashige et al. | 264/140 |

FOREIGN PATENT DOCUMENTS

| | | |
|---|---|---|
| JP | 62-299325 | 12/1987 |
| JP | 09-239037 | 9/1997 |
| JP | 11-508196 | 7/1999 |
| JP | 2001-252967 A | 9/2001 |
| JP | 2001-310366 A | 11/2001 |
| JP | 2004-322387 A | 11/2004 |
| JP | 2006-112507 A | 4/2006 |

\* cited by examiner

*Primary Examiner* — Yogendra Gupta
*Assistant Examiner* — Joseph Leyson
(74) *Attorney, Agent, or Firm* — Foley & Lardner LLP

(57) ABSTRACT

A resin molding device which molds a resin tube 1 from a molten resin has a tube molding portion 14 and a spindle 15 as jigs which define inner and outer diameters of the resin tube.

8 Claims, 11 Drawing Sheets

RESIN MOLDING DEVICE

This application is the National Phase of PCT/JP2008/054925, filed Mar. 18, 2008, which claims priority to Japanese Application No. 2007-084184, filed Mar. 28, 2007, the disclosures of which are hereby incorporated by reference in their entirety.

TECHNICAL FIELD

This invention relates to an extrusion molding device and, in particular, to a resin molding device which molds a resin tube. Further, this invention relates to a resin molding device which molds a resin tube suitable for transporting a fluid, such as ultrapure water and a chemical solution for use in a production line of a semiconductor device or other electronic devices.

BACKGROUND ART

Generally, in manufacturing a semiconductor device, a liquid crystal display device, and the like, ultrapure water (UPW) (including ultrapure water containing hydrogen or ozone, i.e., so-called hydrogen water or ozone water) is often transported and supplied through a resin tube (resin pipe), as well as various chemical solutions. As mentioned above, ultrapure water is used in manufacturing the semiconductor device or the like. This is because, if water used in a cleaning process and the like contains a large amount of oxygen in the form of dissolved oxygen, a natural oxide film is formed by the dissolved oxygen. In recent years, it is pointed out that, even when ultrapure water is used, the natural oxide film is similarly formed. Therefore, it is practiced to completely remove oxygen, particles, and metal components in ultrapure water.

For example, when the semiconductor device is manufactured using a silicon crystal, coexistence of oxygen and water causes the natural oxide film (SiOx) to be formed on a silicon surface. Especially, it is also pointed out that, if oxygen is contained in an aqueous solution, the silicon surface is oxidized and etched to increase surface microroughness.

In recent years, attention is drawn to a Si (110) crystal surface which has a higher current drive capability of a PMOSFET than that of a Si (100) crystal surface. However, such surface is severely etched in an aqueous solution as compared to the Si (100) surface. In general, the silicon surface is cleaned by wet cleaning using the aqueous solution. In that case, for the above-mentioned reason, it is required to prevent oxygen from being mixed into the aqueous solution.

Herein, it is pointed out that mixture of oxygen into the aqueous solution occurs not only during processing, such as in a cleaning process, but also in the resin tube forming a transport line for ultrapure water, a chemical solution, and the like.

In order to reduce mixture of oxygen in the transport line, Patent Document 1 discloses a resin tube comprising a resin tube body and a heat-shrinkable strip-like film which is formed of a resin capable of suppressing gas permeation and spirally wound around the resin tube body so that parts of the film overlap with each other. In Patent Document 1, the wound-around strip-like film is heated in a vacuum atmosphere at a temperature lower than a melting point of the strip-like film to cause heat shrinkage and fusion-bonding of the wound-around strip-like film, thereby excluding air between the parts of the wound-around film. Further, Patent Document 1 discloses that, as the tube body, a fluororesin, such as a tetrafluoroethylene-perfluoroalkylvinylether copolymer (PFA), a polytetrafluoroethylene resin (PTFE), and a tetrafluoroethylene-hexafluoropropylene copolymer (FEP), is used. Furthermore, it is also disclosed that, as the strip-like film, polyvinylidene chloride which has a low gas permeation rate and a heat-shrinkable characteristic is used. Thus, the strip-like film forms a gas permeation suppressing outer coating layer to thereby prevent a gas from permeating the outer coating layer and being dissolved into ultrapure water or a chemical solution flowing through the tube.

On the other hand, Patent Document 2 discloses, as a resin tube for use in a semiconductor manufacturing device, a liquid crystal manufacturing device, and the like, a fluororesin double tube comprising two laminated layers of fluororesin. The fluororesin double tube disclosed in Patent Document 2 comprises an inner layer tube and an outer layer tube. The inner layer tube is formed of a fluororesin excellent in corrosion resistance and in chemical resistance (for example, a tetrafluoroethylene-perfluoroalkylvinylether copolymer (PFA), a tetrafluoroethylene-hexafluoropropylene copolymer (FEP), or a tetrafluoroethylene-ethylene copolymer (ETFE)). The outer layer tube is formed of a fluororesin capable of suppressing gas permeation (for example, polyvinylidene-fluoride (PVDF)). The fluororesin double tube has a structure in which the inner layer tube and the outer layer tube are welded to each other.

The fluororesin double layer tube disclosed in Patent Document 2 is excellent in corrosion resistance, in chemical resistance, and in gas impermeability and is advantageous in that the inner layer tube and the outer layer tube can firmly be joined to each other.

Patent Document 1: JP-A-2004-322387
Patent Document 2: JP-A-2006-112507

DISCLOSURE OF THE INVENTION

Problem to be Solved by the Invention

Incidentally, the resin tube of the type is manufactured by an extrusion molding device and an outer-diameter sizing method is generally used for molding.

Hereinbelow, the extrusion molding device and the outer-diameter sizing method will briefly be described.

FIG. 1 shows a schematic structure of the extrusion molding device. In FIG. 1, a resin material (pellets) stored in a storage tank 41 is transported through a transport line 42 to a hopper 51 of the extrusion molding device 50. The extrusion molding device 50 comprises a heating cylinder 52, a screw 53 disposed therein, and a heater (not shown in the figure) for heating a resin. The resin supplied from the hopper 51 is melted by the heater and delivered by the screw 53 to a head side thereof. In the extrusion molding device 50, a die 54 is provided on the head side of the screw 53. A resin tube before solidification, which is delivered from the die 54, is pulled through a sizing die 55 having cooling means (not shown in the figure) to be solidified. The solidified resin tube 60 is tested through a tester 70. It is noted here that a pulling force for the resin tube 60 is obtained by a haul-off unit 80. The resin tube which is pulled to reach the haul-off unit 80 is sent to a take-up unit 90 to be wound on a drum 91.

FIG. 2 is a view for describing the outer-diameter sizing method and shows only a head portion of a screw 101 and a part therearound in an extrusion molding device. In FIG. 2, a die 102 and a sizing die 103 are provided on a head side of the screw 101. The sizing die 103 defines an outer diameter of the resin tube 60. The resin tube 60 coming out from the sizing die 103 is cooled and solidified by cooling means and pulled by a haul-off unit at a predetermined haul-off speed.

In the outer-diameter sizing method, it is possible to suppress variation in outer diameter size of products within ±10 µm. However, it is difficult to suppress variation in product thickness and in inner diameter size so that variation of approximately ±100 µm is inevitably caused to occur. Since a mold structure for fixing an inner-diameter side is not provided, when a molded resin is in a molten state before being solidified into a product shape, it is not possible to increase the haul-off speed. As a result, productivity is decreased. For example, in a case of PFA, the haul-off speed is approximately 2 m/min for a resin tube having a ¼-inch size and approximately 55 cm/min for a resin tube having a 1-inch size.

Incidentally, in existing extrusion molding devices, no consideration is made about prevention of mixture of moisture, oxygen, or the like in the atmosphere and selection of a molding device material having a metal surface which does not have a catalytic effect of accelerating decomposition of a resin to be molded. Accordingly, it is supposed that decomposition of the resin is accelerated at a stage of molding and a low-molecular component is generated. The low-molecular component causes degassing and TOC (Total Organic Carbon) leaching from a product (resin tube) and becomes a contamination source in a cleaning process. Therefore, it is required to consider a structure of the molding device.

There exists the outer-diameter sizing method having a mold structure for fixing an outer-diameter shape when a resin tube is molded or an inner-diameter sizing method having a mold structure for fixing an inner-diameter shape. However, a method of simultaneously sizing the outer and the inner diameters is not known. Further, an extrusion molding device is not provided which is prevented from mixture of an air atmosphere and which is constructed by a metal material selected in view of the catalytic effect with a resin to be molded.

It is an object of the present invention to provide a resin molding device capable of contributing to improvement in productivity by increasing a haul-off speed of a resin tube.

It is another object of the present invention to provide a resin molding device capable of contributing to improvement in product dimensional accuracy.

It is still another object of the present invention to provide a resin molding device which is for molding a resin tube mainly intended for supply of ultrapure water or a chemical solution and which is reduced in generation of impurities.

It is yet another object of the present invention to provide a resin molding device which does not cause decomposition and dissociation of a polymer material as a raw material of a resin tube.

Means to Solve the Problem

A resin molding device according to the present invention has the following aspects.

[First Aspect]

A resin molding device which molds a resin tube from a molten resin, the device comprising a jig which defines inner and outer diameters of the resin tube.

[Second Aspect]

In the resin molding device according to the first aspect, at least a part of the jig, which is to be brought into contact with the molten resin, is formed of a heat-resistant material having a low catalytic effect which does not accelerate decomposition of the molten resin.

[Third Aspect]

In the resin molding device according to the first or second aspect, the jig comprises control means which controls an atmosphere of a hollow portion of the resin tube so that oxygen of not more than 0.1 wt % and moisture of not more than 0.1 wt % are contained.

[Fourth Aspect]

In the resin molding device according to the first or second aspect, the device comprises control means which controls an atmosphere of any area where the molten resin and a raw material of the molten resin are present, including an area associated with the resin molding device, so that oxygen of not more than 0.1 wt % and moisture of not more than 0.1 wt % are contained.

[Fifth Aspect]

In the resin molding device according to the second aspect, all parts to be brought into contact with the molten resin are formed of a heat-resistant material having a low catalytic effect which does not accelerate decomposition of the molten resin.

[Sixth Aspect]

In the resin molding device according to the second aspect, the heat-resistant material is formed of at least one of $Al_2O_3$, $Cr_2O_3$, Ni, $NiF_2$, and hastelloy.

[Seventh Aspect]

In the resin molding device according to one of the first through sixth aspects, the device comprises a first resin reservoir which stores a predetermined amount of the molten resin and first extruding or extracting means which extracts the molten resin from the first resin reservoir and forms a resin tube while defining inner and outer diameters by the jig.

[Eighth Aspect]

In the resin molding device according to the seventh aspect, the device further comprises, on a downstream side in an extruding or extracting direction, a second resin reservoir which stores a predetermined amount of a second molten resin and second extruding or extracting means which extracts the second molten resin from the second resin reservoir and laminates the second molten resin so as to cover an outside of the resin tube formed by the first extruding or extracting means.

[Ninth Aspect]

A resin molding device which molds a resin tube from a molten resin, the device comprising control means which controls an atmosphere of any area where the molten resin and a raw material of the molten resin are present, including an area associated with the resin molding device, so that oxygen of not more than 0.1 wt % and moisture of not more than 0.1 wt % are contained.

[Tenth Aspect]

In the resin molding device according to the ninth aspect, at least a part to be brought into contact with the molten resin is formed of a heat-resistant material having a low catalytic effect which does not accelerate decomposition of the molten resin.

[Eleventh Aspect]

In the resin molding device according to the ninth or tenth aspect, the control means includes a control section which controls an atmosphere of a hollow portion of the resin tube so that oxygen of not more than 0.1 wt % and moisture of not more than 0.1 wt % are contained.

[Twelfth Aspect]

In the resin molding device according to the tenth aspect, the heat-resistant material is formed of at least one of $Al_2O_3$, $Cr_2O_3$, Ni, $NiF_2$, and hastelloy.

[Thirteenth Aspect]

In the resin molding device according to any one of the first through twelfth aspect, the resin tube has an oxygen permeability coefficient of not more than $5 \times 10^6$ [molecules·cm/ cm$^2$·sec·Pa] and a flexural modulus of not more than 1800 MPa and contains a fluororesin.

[Fourteenth Aspect]

In the resin molding device according to any one of the first through thirteenth aspect, the resin tube has an inner surface formed of a material resistant to at least one of an alkaline aqueous solution, an acidic aqueous solution, a neutral aqueous solution, and an organic solvent.

[Fifteenth Aspect]

In the resin molding device according to any one of the first through thirteenth aspect, the resin tube is formed of at least one of PVDF, ETFE, PTFE, PVDC, FEP, PFA, and nylon.

[Sixteenth Aspect]

In the resin molding device according to the eighth aspect, the resin tube is formed by layers of a plurality of materials different in composition from one another.

[Seventeenth Aspect]

In the resin molding device according to the sixteenth aspect, the plurality of materials forming the resin tube are selected from PVDF, ETFE, PTFE, PVDC, FEP, PFA, and nylon.

Effect of the Invention

According to the resin molding device of the present invention, it is possible to suppress variation in product dimension (an outer diameter, an inner diameter, and a thickness) of the resin tube (in a range within ±10 μm for each dimension).

By simultaneous sizing for outer and inner diameters, a haul-off speed can be increased to thereby increase productivity.

Further, it is possible to provide a resin tube mainly intended for supply of ultrapure water or a chemical solution and which is reduced in generation of impurities.

Furthermore, it is possible to provide a resin molding device which does not cause decomposition and dissociation of a polymer material as a raw material of a resin tube.

BEST MODE FOR CARRYING OUT THE INVENTION

Hereinbelow, an extrusion molding device according to a first embodiment of the present invention will be described.

In the present invention, not only a main body of the extrusion molding device but also components associated with the main body of the extrusion molding device are provided with measures for achieving the above-mentioned objects. These measures will be described in order in the following.

Figure 1:
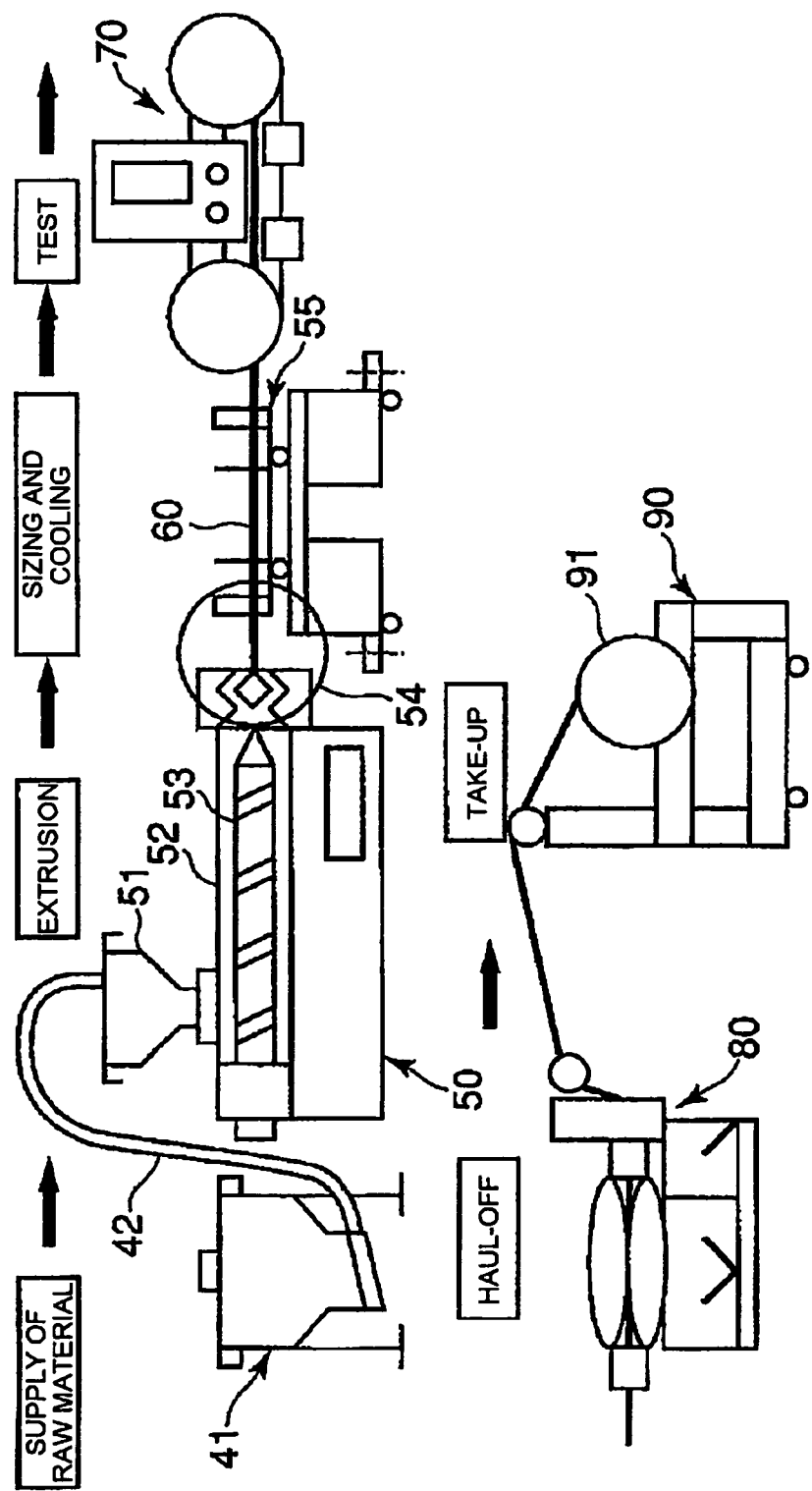
FIG. 1 is a view showing a schematic structure of one example of a conventional resin tube molding device.
Figure 2:
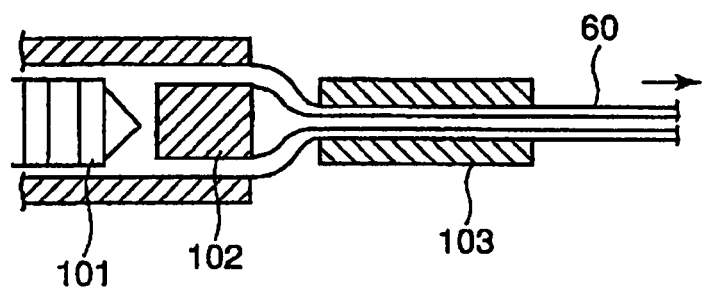
FIG. 2 is a sectional view for describing an outer-diameter sizing method in conventional resin tube molding.
Figure 3:
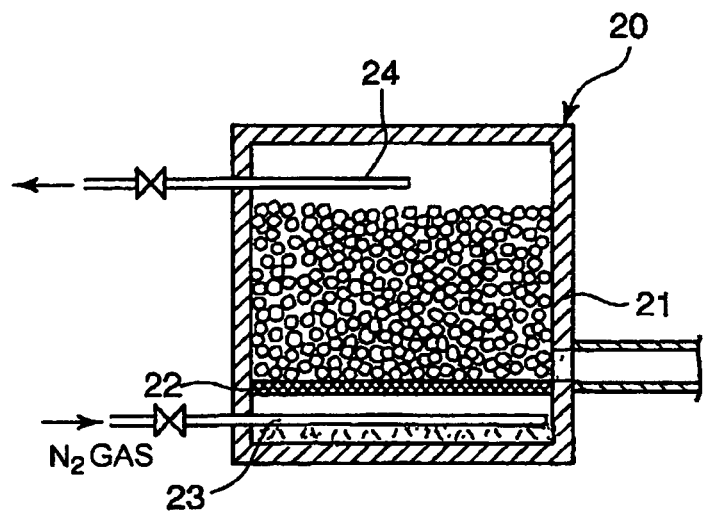
FIG. 3 is a sectional view showing one example of a storage tank for storing a raw resin material, which is provided in an extrusion molding device according to the present invention.

First Measure: Removal of Moisture and Oxygen in a Raw Resin Material Supply Portion In the first embodiment, the storage tank 41 described in connection with FIG. 1 is replaced by a storage tank 20 as shown in FIG. 3. The storage tank 20 is supplied with a pellet-like raw resin material which has been cleaned and dried. In the storage tank 20, moisture and oxygen adhered to a surface of the raw resin material are removed in a N$_2$ atmosphere at a temperature exceeding 100° C. (highest allowable temperature). As a structure therefor, the storage tank comprises a sealable tank 21, a porous filter member 22 (for example, porous ceramic, a metal filter, a PTFE filter, or the like) disposed in the vicinity of a bottom portion of the sealable tank, a N$_2$ gas introducing portion 23 penetrating the tank 21 and extending in a space below the filter member 22, and a N$_2$ gas discharging portion 24 penetrating the tank 21 from an upper space toward the outside.

Particularly, an inner wall of the tank 21 and the filter member 22 are processed by a material which will later be described, so as not to have a catalytic effect to the raw resin material. The N$_2$ gas introducing portion 23 ejects a N$_2$ gas having a temperature exceeding 100° C. toward a bottom surface to deaden or lessen an initial flow rate so that the N$_2$ gas uniformly flows in the raw resin material through the porous filter member 22. The introduced N$_2$ gas is discharged from the N$_2$ gas discharging portion 24.

After moisture and oxygen are removed as mentioned above, the raw resin material is transported to a hopper in the extrusion molding device under a N$_2$ gas atmosphere.

Second Measure: a Sealed-Type Structure Under a N$_2$ Gas Atmosphere

In the first embodiment, all parts of the storage tank 21, the hopper, a screw, and so on which are associated with the raw resin material, including a transport path of the resin material, are formed into a sealed-type structure under a N$_2$ gas atmosphere. Their surfaces to be brought into contact with a molten resin are processed so as not to have a catalytic effect. With this structure, in combination with the above-mentioned first measure, all areas associated with the extrusion molding device where the raw resin material and the molten resin are present, including the main body of the extrusion molding device can be kept in an atmosphere containing oxygen of not more than 0.1% and moisture of not more than 0.1%.

Third Measure: Improvement in Haul-Off Speed of a Resin Tube

In a conventional extrusion molding device, a molten resin extruding portion and a tube molding portion are separated. As a result, it is not possible to increase a haul-off speed of a resin tube.

In contrast, in the first embodiment, the molten resin extruding portion and the tube molding portion are formed into a continuous structure so as to increase the haul-off speed and an extruding speed of the molten resin is increased in correspondence to an increase in haul-off speed, as will be described in the following. Accordingly, the extruding speed and the haul-off speed are balanced with each other and a resin tube molding process at a high speed can be achieved. It is noted here that an outer diameter, an inner diameter, and a thickness of the resin tube are ensured by a gap of a molding jig (a gap between an outer diameter defining portion and an inner diameter defining portion) defining the outer diameter and the inner diameter of the resin tube.

Figure 4:
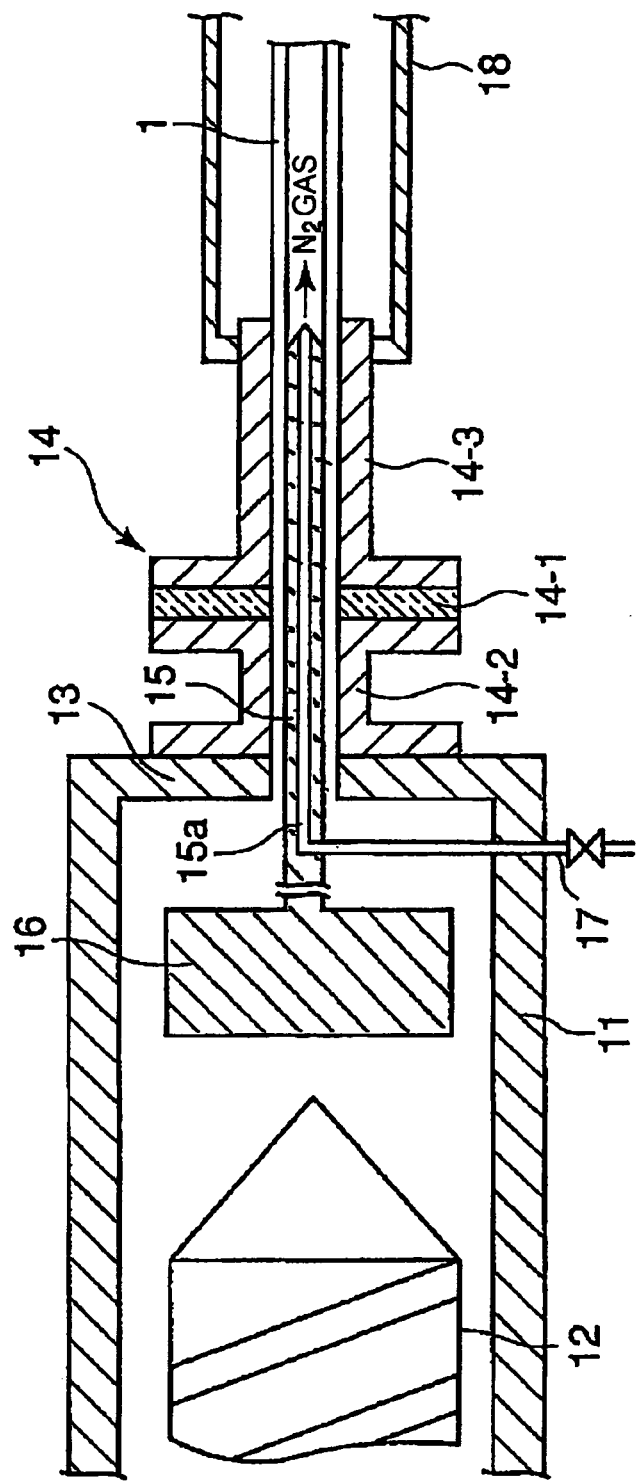
FIG. 4 is a sectional view showing a characteristic structure of an extrusion molding device according to a first embodiment of the present invention.

Referring to FIG. 4, the extrusion molding device according to the first embodiment of the present invention will be described. FIG. 4 shows a structure of a part of the extrusion molding device around a head portion of the screw and its downstream side, which is a characteristic part of the present invention.

In FIG. 4, the screw 12 is disposed inside a heating cylinder 11. Around the head portion of the screw 12, that is, at an end portion of the heating cylinder 11, a molten resin extruding portion 13 is formed. The extruding portion 13 is connected to a tube molding portion 14. The tube molding portion 14 has a function as a jig defining the outer diameter of the resin tube and is separated into a cylinder member 14-2 on the side of the heating cylinder 11 and a cylinder member 14-3 on the side of a haul-off unit by an insulating material 14-1 having a through hole and interposed therebetween. The cylinder members 14-2 and 14-3 have flanges formed at portions faced to the insulating material 14-1 and coupled to each other by bolts, nuts, or the like (omitted in the figure). On the side of the cylinder member 14-2, for example, at the extruding portion 13, a heater (omitted in the figure) is disposed or embedded to maintain a temperature T1. On the side of the cylinder member 14-3, a cooling portion (omitted in the figure) by water-cooling or the like is disposed to maintain a temperature T2. Herein, it is readily understood that the temperature T1 is not lower than a melting point at which the raw resin material is melted while the temperature T2 is not higher than the melting point and causes the molten resin to be solidified.

It is noted here that the insulating material used in the present invention may be any material resistant to a high temperature. For example, use may be made of an insulating material which has a hollow plate shape with its inside hermetically sealed by a high heat-resistant metal sheet. A hollow portion is filled with a heat-resistant filler, such as a glass fiber, and the inside is kept at a vacuum. This also applies to another embodiment which will later be described.

In the first embodiment, as a jig defining an inner diameter of the resin tube, a spindle 15 is inserted from the extruding portion 13 into the tube molding portion 14 and extends to a position near an exit thereof. The spindle 15 is held by a spindle holding portion 16 which is mechanically separated from the screw 12. The spindle holding portion 16 is fixed to an inner wall of the heating cylinder 11. In order to prevent interference with the flow of the molten resin from the side of the screw 12 in the heating cylinder 11, the spindle holding portion is fixed to the inner wall of the heating cylinder 11 at a plurality of positions circumferentially-spaced from one another.

When the molten resin is thus injected from the extruding portion 13 into the tube molding portion 14, it is possible to haul or pull, from an end of the tube molding portion 14, the resin tube 1 whose outer diameter and inner diameter are defined by an inner diameter of the tube molding portion 14 and an outer diameter of the spindle 15.

In the first embodiment, a hole 15a is formed at the center of the spindle 15 and extends to an end of the spindle along a central axis. The hole 15a has an opposite end portion connected to a pipe 17 penetrating through the heating cylinder 11. Through the pipe 17, a $N_2$ gas is introduced and injected into a hollow portion of the resin tube 1 which is extracted from the tube molding portion 14. As a result, the hollow portion of the resin tube 1 can be kept in an atmosphere containing oxygen of not more than 0.1% and moisture of not more than 0.1%. From the above, a $N_2$ gas introducing system introducing the $N_2$ gas into the hollow portion of the resin tube 1 operates as a control section for controlling the atmosphere of the hollow portion of the resin tube 1. This also applies to another embodiment which will later be described.

Figure 5:
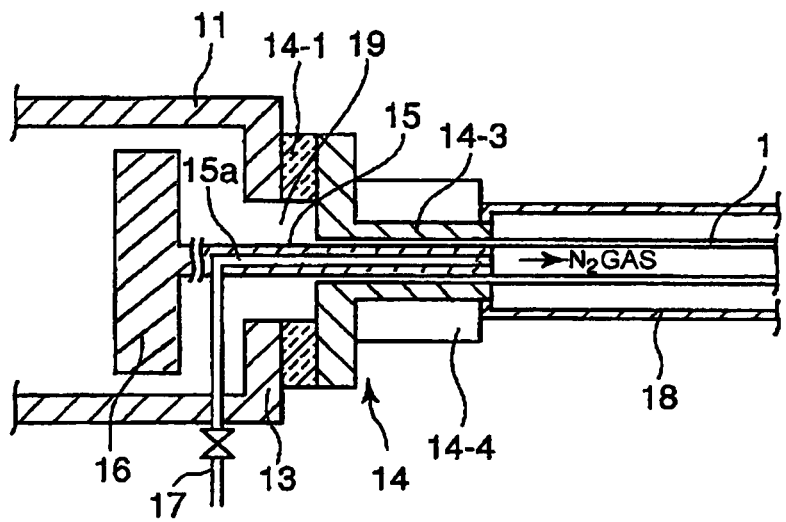
FIG. 5 is a sectional view showing a modification of the embodiment in FIG. 4.

Incidentally, in order to achieve a resin tube molding process at a high speed in a condition where the extruding speed and the haul-off speed are balanced with each other as mentioned above, i.e., a molding process excellent in productivity, the molten resin must sufficiently be supplied to the tube molding portion 14. In other words, it is preferable that a resin reservoir capable of storing a sufficient amount of molten resin is provided at an inlet of the tube molding portion 14 so as to follow high-speed pulling of the resin tube. Further, it is advantageous that the tube molding portion 14 has a shorter length. FIG. 5 shows a modification of the first embodiment taking the above into consideration.

In the modification in FIG. 5, the cylinder member 14-2 in the tube molding portion 14 described with reference to FIG. 4 is omitted. Specifically, the flange of the cylinder member 14-3 is fixed to a peripheral portion of an end opening of the heating cylinder 11 through the insulating material 14-1 having the through hole. The end opening of the heating cylinder 11 has a diameter greater than an inner diameter of the cylinder member 14-3. With this structure, the tube molding portion 14 is reduced in length and, further, the extruding portion 13 is provided with a resin reservoir 19. It is noted that a heater (not shown in the figure) is provided at an end portion of the heating cylinder 11 and a cooling portion 14-4 is provided around the cylinder member 14-3. The spindle 15 and the spindle holding portion 16 may be the same as those shown in FIG. 4 except that the spindle 15 is reduced in length by the length of the cylinder member 14-2 (FIG. 4).

As shown in both of FIGS. 4 and 5, a tubular casing 18 may be fitted to an end portion of the tube molding portion 14. The tubular casing is adapted to cover a periphery of the resin tube 1 coming out from the tube molding portion 14. It is preferable that a $N_2$ gas is introduced also into the tubular casing 18. In other words, it is preferable that not only an inner peripheral side but also an outer peripheral side of the resin tube 1 is placed in a $N_2$ gas atmosphere.

Figure 6:
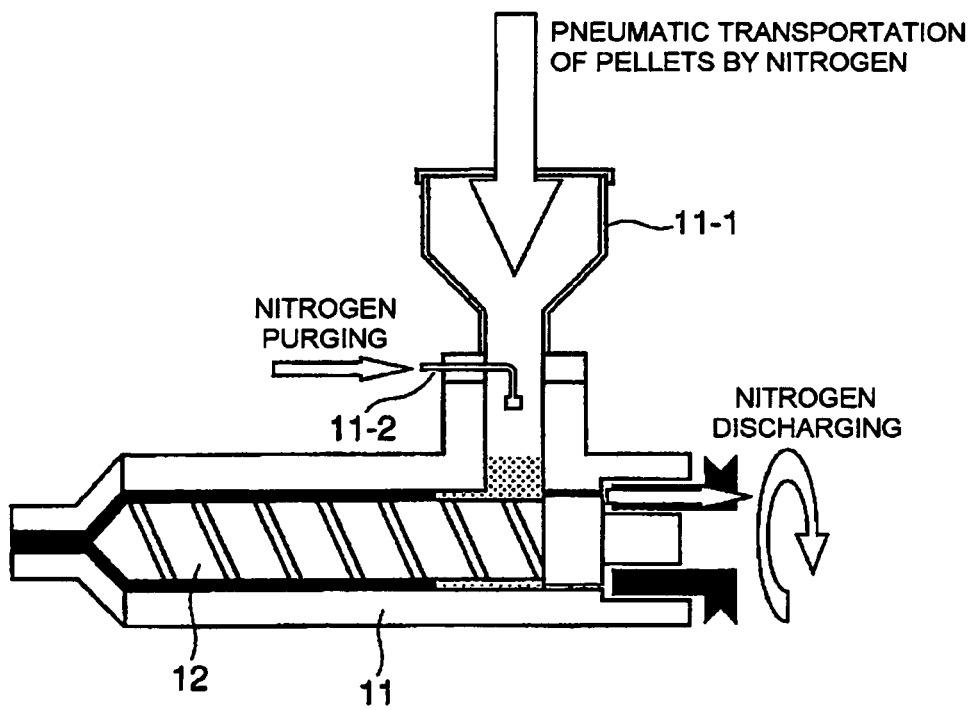
FIG. 6 is a view showing N$_2$ gas displacement inside a heating cylinder in the present invention.

FIG. 6 is a view showing $N_2$ gas displacement inside the heating cylinder 11. The resin material (pellets) pneumatically transported by the $N_2$ gas from the storage tank 20 described with reference to FIG. 3 is charged into a hopper 11-1. A $N_2$ gas purging portion 11-2 is provided in the middle of a path from the hopper 11-1 to the heating cylinder 11. The $N_2$ gas introduced into the heating cylinder 11 is discharged from the side of a drive axis of the screw 12.

Figure 7:
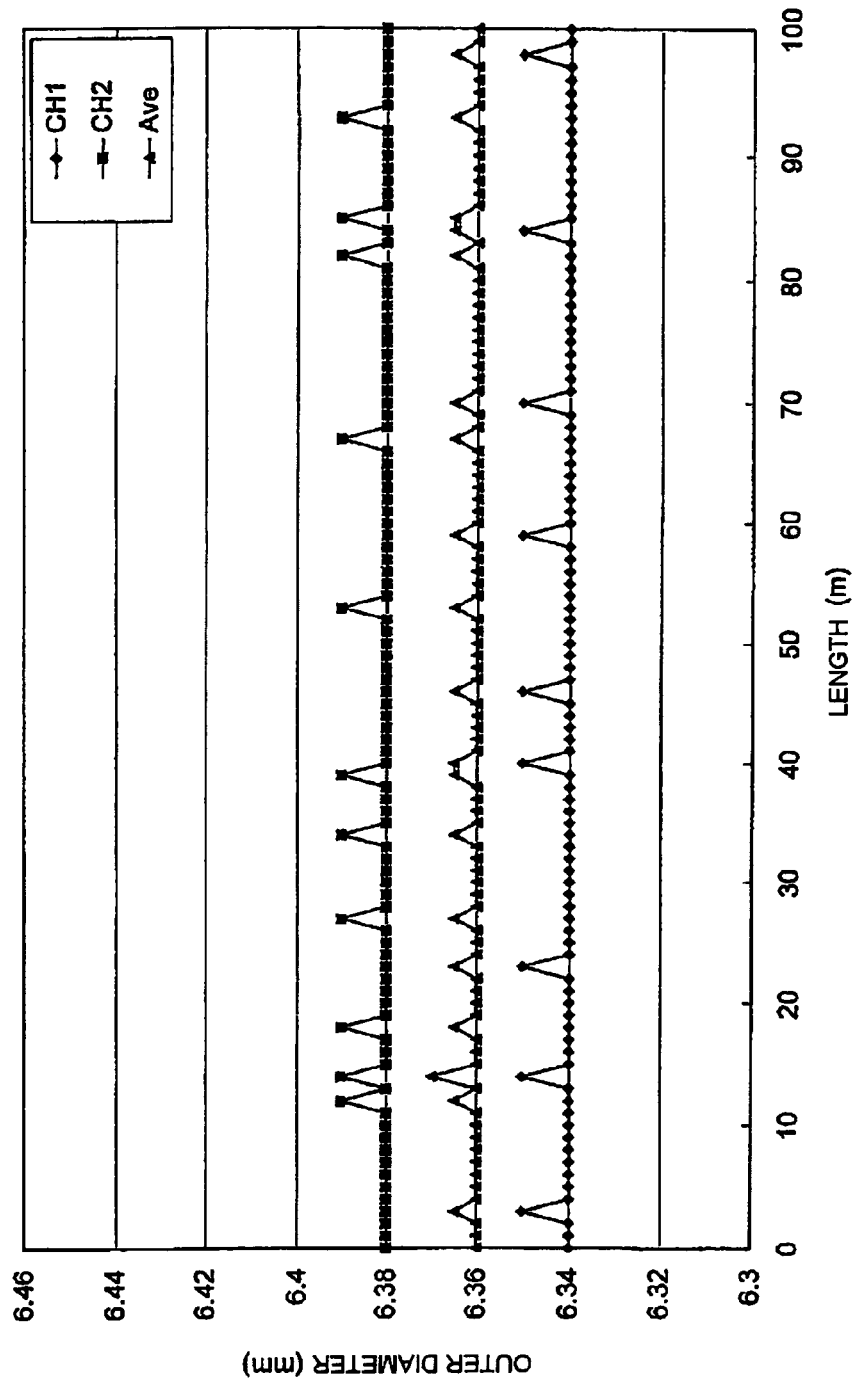
FIG. 7 shows actual measurement values of an outer diameter of a PFA tube among resin tubes manufactured by the extrusion molding device according to the first embodiment.
Figure 8:
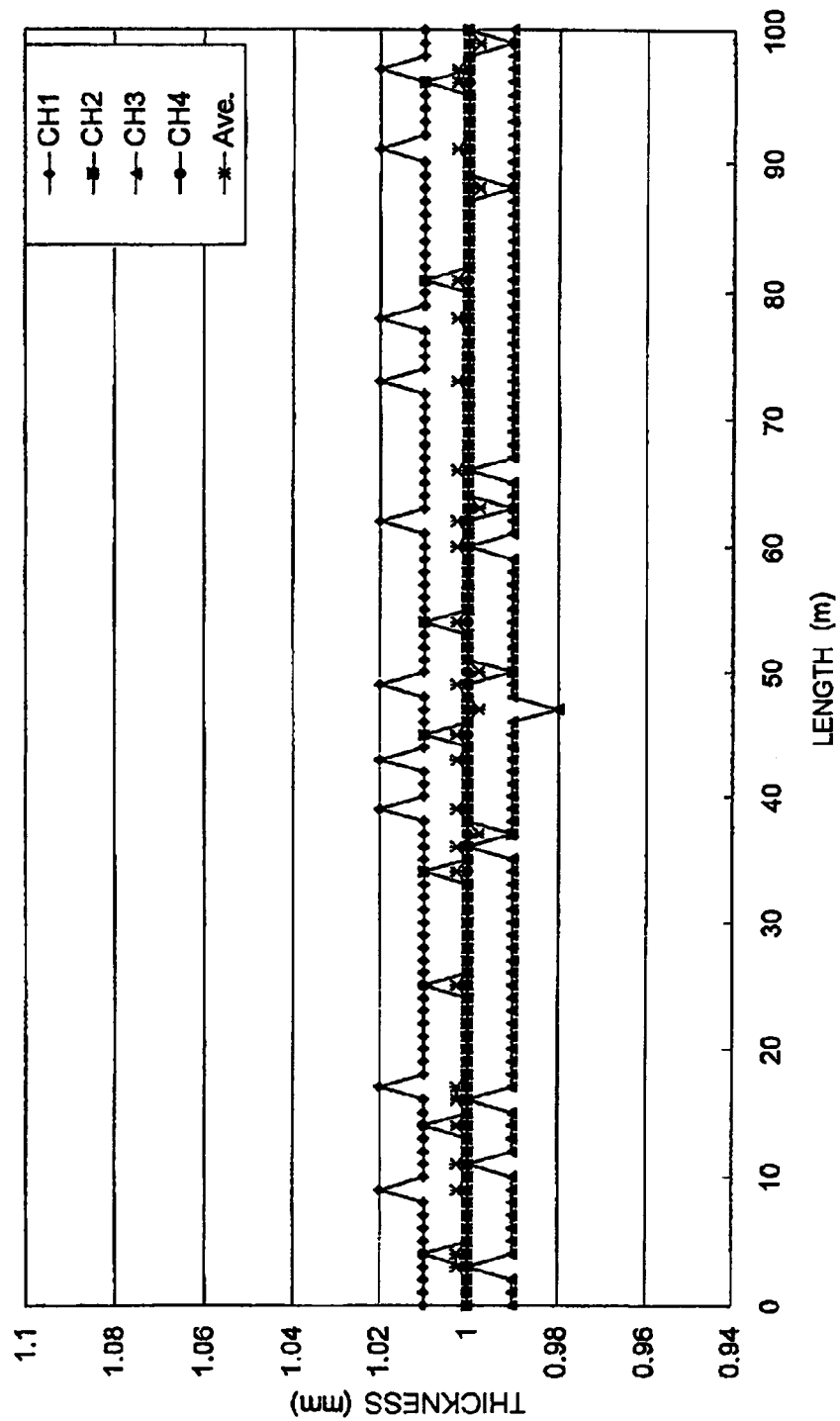
FIG. 8 shows actual measurement values of a thickness of the PFA tube among the resin tubes manufactured by the extrusion molding device according to the first embodiment.
Figure 9:
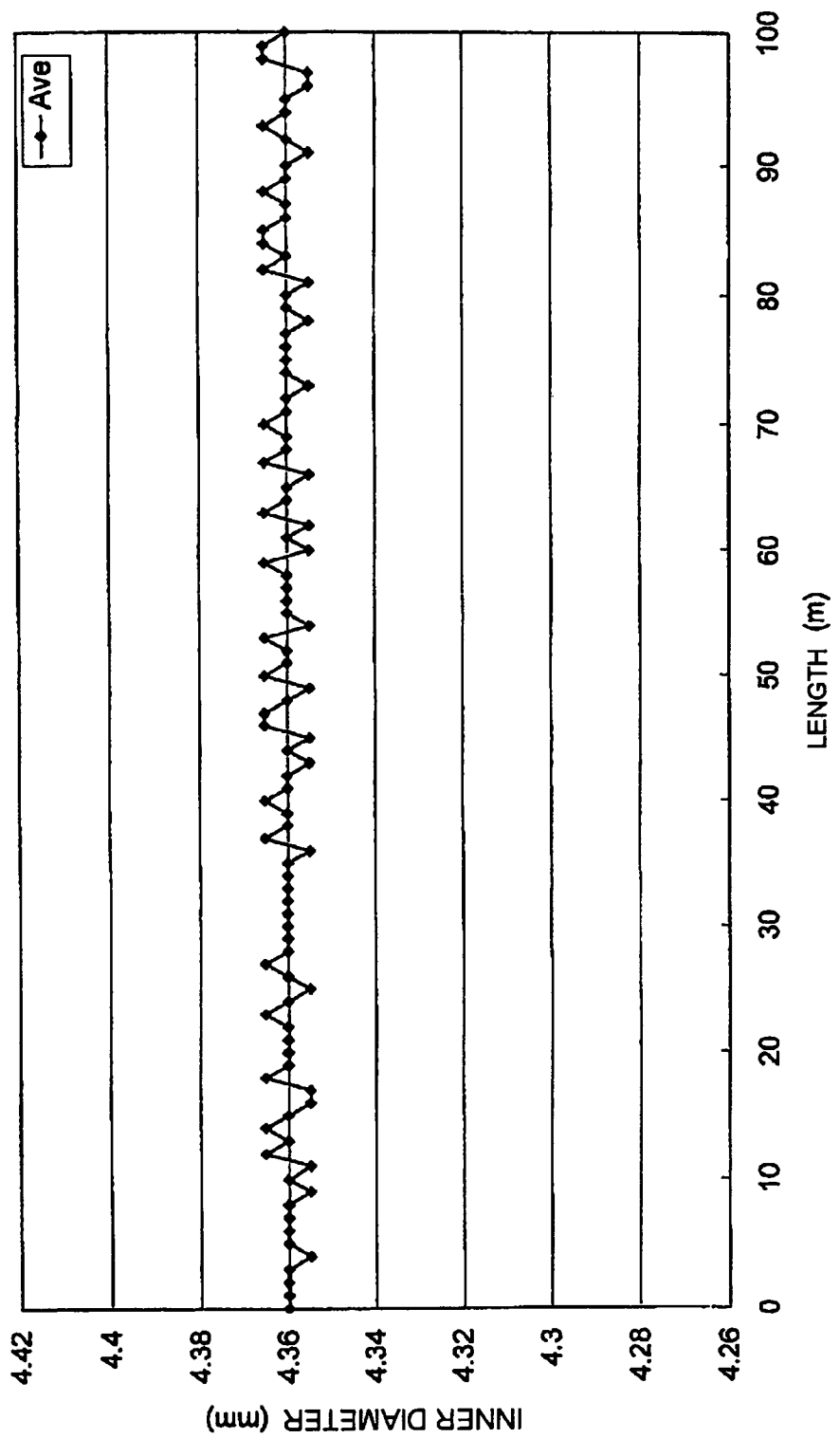
FIG. 9 shows actual measurement values of an inner diameter of the PFA tube among the resin tubes manufactured by the extrusion molding device according to the first embodiment.

FIGS. 7 through 9 show actual measurement values of an outer diameter, a thickness, and an inner diameter of a PFA tube, respectively, among the resin tubes manufactured by the embodiment mentioned above. An abscissa shows a length of the PFA tube and an ordinate shows an actual measurement value for each dimension. In each figure, "CH1" through "CH4" show a plurality of kinds of actual measurement value data and "Ave" shows an average value thereof. For all of the outer diameter, the thickness, and the inner diameter, variation is suppressed within about ±10 μm.

Next, description will be made about an embodiment in a case where the present invention is applied to an extrusion molding device which molds a resin tube having a multilayer structure.

Figure 10:
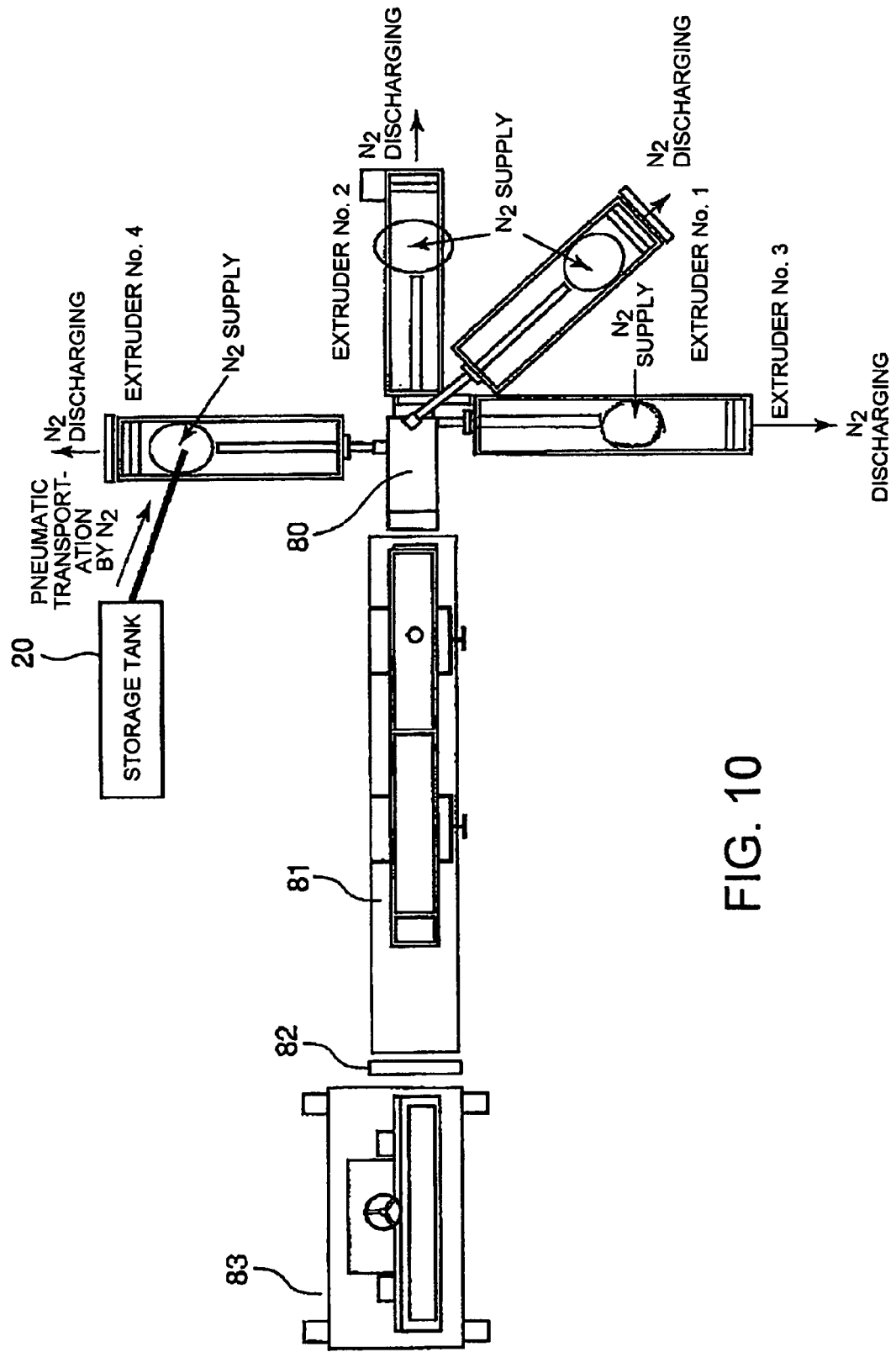
FIG. 10 shows a schematic structure of a multilayer tube extrusion molding device in a case of four layers.

FIG. 10 shows a schematic structure of a multilayer tube extrusion molding device in a case of four layers. Herein, extruding portions of four extruders No. 1 through No. 4 are connected to a four-layer spiral die 80. As mentioned in the foregoing, the raw resin material is pneumatically transported by the $N_2$ gas from the storage tank 20 to a hopper of each of the extruders and the $N_2$ gas is purged. The purged $N_2$ gas is discharged from a rear portion (the side of the drive axis of the screw) of the heating cylinder. On a downstream side of the spiral die 80, a vacuum water tank 81 for cooling the extracted resin tube, a measuring instrument 82 for measuring the outer diameter of the resin tube, and a haul-off/take-up unit 83 for the resin tube are arranged.

Figure 11:
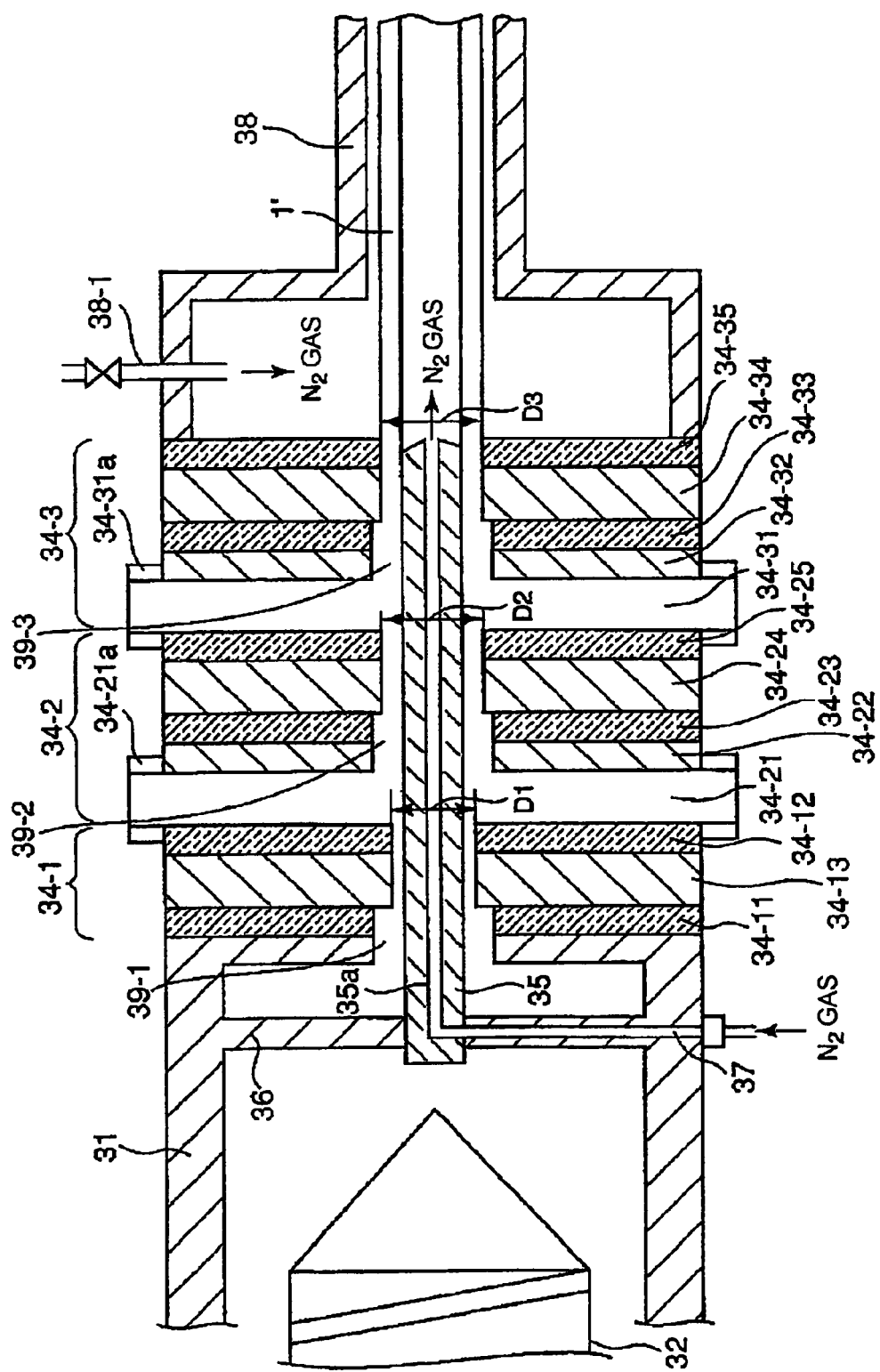
FIG. 11 is a sectional view showing a characteristic structure of an extrusion molding device according to a second embodiment of the present invention, which is for manufacturing a resin tube having a multilayer structure.

FIG. 11 shows one example of a sectional structure of a part corresponding to the spiral die 80 shown in FIG. 10. The spiral die is well known and the illustrated example shows a case where the molding device is implemented with a different structure. Of course, the molding device may be implemented with the spiral die. In FIG. 10, the case of four layers is shown but, in FIG. 11, a part for molding a resin tube having a three-layer laminated structure is illustrated for convenience.

In FIG. 11, the extrusion molding device has a structure in which, at an end portion of a heating cylinder 31 with a screw 32 housed therein, a first tube molding portion 34-1, a second tube molding portion 34-2, and a third tube molding portion 34-3 are sequentially connected in series to one another. Each of the first through the third tube molding portions 34-1 through 34-3 allows a spindle 35 to be inserted at its center. The first tube molding portion 34-1 includes two insulating materials 34-11 and 34-12 and a first cooling portion 34-13 interposed therebetween. It is noted that a heater for the first tube molding portion is provided at the end portion of the heating cylinder 31 in a manner similar to that mentioned above. The second tube molding portion 34-2 includes a second-layer resin injecting portion 34-21, a heater 34-22, an insulating material 34-23, a second cooling portion 34-24, and an insulating material 34-25. The third tube molding portion 34-3 includes a third-layer resin injecting portion 34-31, a heater 34-32, an insulating material 34-33, a third cooling portion 34-34, and an insulating material 34-35. The second-layer resin injecting portion 34-21 and the third-layer resin injecting portion 34-31 are connected to a second-layer extruder and a third-layer extruder, respectively.

In FIG. 11, for example, the first tube molding portion 34-1 is shown in a state where the two insulating materials and the cooling portion are directly mounted. Actually, however, these components are mounted in a state where they are attached to an outer peripheral side of a cylinder member having flanges as described with reference to FIG. 4. The second tube molding portion 34-2 is also formed in a state where the heater, the two insulating materials, and the second cooling portion are attached to the outer peripheral side of the cylinder member having the flanges as mentioned above. The second-layer resin injecting portion 34-21 is formed, for example, in the manner such that a space between the flange with the insulating material 34-12 attached thereto and another flange with the heater 34-22 attached thereto is closed at their peripheral side and that a closed part is provided with a plurality of molten resin injecting ports 34-21a circumferentially spaced from one another. The third tube molding portion 34-3 is also formed in the similar manner.

The first, the second, and the third tube molding portions 34-1, 34-2, and 34-3 operate as jigs defining outer diameters of resin tubes of the first layer, the second layer, and the third layer, respectively. Outer diameters D1, D2, and D3 of exits of the tube molding portions have a relationship of D1<D2<D3. Further, because of a reason similar to that described with reference to FIG. 5, first, second, and third resin reservoirs 39-1, 39-2, and 39-3 are formed at inlets of the first, the second, and the third tube molding portions 34-1, 34-2, and 34-3, respectively.

The spindle 35 is inserted into the first through the third tube molding portions 34-1 through 34-3 through a spindle holding portion 36 formed around a head of the screw 32 inside the heating cylinder 31. The spindle 35 has a hole 35a formed at the center thereof and extending along a central axis to an end thereof. The hole 35a has an opposite end portion connected to a gas introducing path 37 penetrating through the heating cylinder 31 and the spindle holding portion 36. A $N_2$ gas is introduced into the gas introducing path 37 through a pipe and the $N_2$ gas is ejected to an inner peripheral side of a resin tube 1' extracted from the third tube molding portion 34-3.

Like the embodiment mentioned above, a tubular casing 38 is formed at an end portion of the third tube molding portion 34-3 to cover the resin tube 1' extracted from the third tube molding portion. Into the tubular casing 38, a $N_2$ gas is introduced through a pipe 38-1 to generate a $N_2$ gas atmosphere on an outer peripheral side of the resin tube 1'.

With the above-mentioned structure, in the first tube molding portion 34-1, the first-layer resin tube which is made of a first resin material and which becomes an inner-layer tube is formed and cooled by the first cooling portion 34-13 (first extruding or extracting means). Subsequently, in the second tube molding portion 34-2, a second resin material to become an adhesive layer is injected in a molten state into the second-layer resin injecting portion 34-21. As a result, the adhesive layer is laminated as the second-layer resin tube on an outer peripheral side of the first-layer resin tube which has been cooled and solidified, and is cooled by the second cooling portion 34-24 (second extruding or extracting means). In the similar manner, in the third tube molding portion 34-3, a third resin material to become an outer-layer tube is injected in a molten state into the third-layer resin injecting portion 34-31. As a result, the third-layer resin tube is laminated on an outer peripheral side of the second-layer resin tube as the adhesive layer and is cooled and solidified by the third cooling portion 34-34. Thus, the resin tube 1' comprising a lamination of three layers is hauled or pulled from the third tube molding portion 34-3.

In the present invention, improvement is made not only in structural characteristics of the main body of the extrusion molding device and its peripheral components as mentioned above, but also in a material of each component.

For example, in the tube molding portions and the spindle as the jigs defining the inner and the outer diameters of the resin tube, at least those parts to be brought into contact with the molten resin are formed of a heat-resistant material having a low catalytic effect which does not accelerate decomposition of the molten resin, for example, at least one of $Al_2O_3$, $Cr_2O_3$, Ni, $NiF_2$, and hastelloy. Further, it is desirable that all parts to be brought into contact with the molten resin are formed of the heat-resistant material mentioned above.

With the extrusion molding devices mentioned above, the following effects are obtained.

In order to suppress variation in product dimension (an outer diameter, an inner diameter, and a thickness) of the resin tube (in a range within ±10 μm for each dimension), the extrusion molding devices according to the above-\ mentioned embodiments adopt a structure capable of simultaneously sizing the inner and the outer diameters of the resin tube. The simultaneous sizing of the inner and the outer diameters enables to increase the haul-off speed. Therefore, productivity is increased.

Further, in the extrusion molding devices according to the above-mentioned embodiments, in order to suppress decomposition of the resin during molding, all of the transport system and the heating system for the raw resin material are isolated from an air atmosphere (sealed with the $N_2$ gas) and a metal material of each part to be brought into contact with the molten resin comprises a material which is low in catalytic effect of causing decomposition of the resin as an object to be molded.

Thus, with the extrusion molding devices according to the above-mentioned embodiments, it is possible to greatly contribute to improvement in product dimensional accuracy of the resin tube, improvement in productivity, and reduction in impurity components.

It is noted here that means for isolating all of the transport system and the heating system for the raw resin material from the air atmosphere (sealing with the $N_2$ gas or the like), namely, control means for controlling the atmosphere in all areas where the molten resin and a raw material of the molten resin are present, including the area associated with the extrusion molding device, so that oxygen of not more than 0.1 wt % and moisture of not more than 0.1 wt % are contained, and a technique of forming the metal material of a part to be brought into contact with the molten resin by using a material low in catalytic effect of causing decomposition of the resin as an object to be molded may be applied to a resin molding device which does not have means for simultaneously sizing inner and outer diameters. In this case, it is possible to provide a resin tube reduced in generation of impurities. Further, it is possible to provide a resin molding device which does not cause decomposition and dissociation of a polymer material as a raw material of the resin tube.

Figure 12:
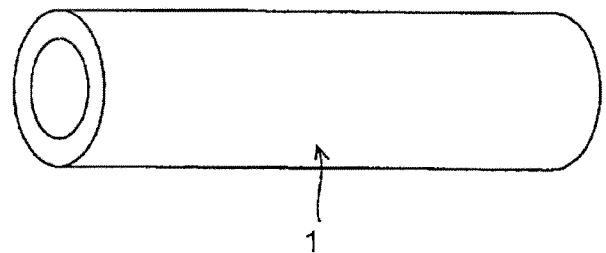
FIG. 12 shows one example of a resin tube manufactured by the extrusion molding device according to the first embodiment.

Referring to FIG. 12, the resin tube manufactured by the extrusion molding device according to the embodiment shown in FIG. 4 or 5 will be described. The resin tube 1 shown in the figure is formed of a single layer of PVDF (polyvinylidene fluoride) subjected to softening, and is called a PVDF tube hereinbelow. Typical PVDF has a flexural modulus of 2000 MPa and has no flexibility. Accordingly, a resin tube formed of the typical PVDF is unsuitable for a resin tube which is required to be subjected to bending or the like. In general, if a flexural modulus is not greater than 1800 MPa, the resin tube is flexible and practically usable.

In view of the above, the PVDF tube 1 shown in the figure is subjected to softening for weakening an intermolecular bonding force by addition of perfluoromonomer. As a result, the softened PVDF tube 1 has a flexural modulus of 1200 MPa to become flexible. Therefore, when the tube is applied to a semiconductor manufacturing device, a liquid crystal manufacturing device, or the like, the tube is freely bendable.

Further, it is found that, as compared to a tube formed of PFA, the softened PVDF tube 1 mentioned above has an extremely excellent impermeability to a gas (oxygen or nitrogen), namely, an extremely low permeability coefficient.

Figure 13:
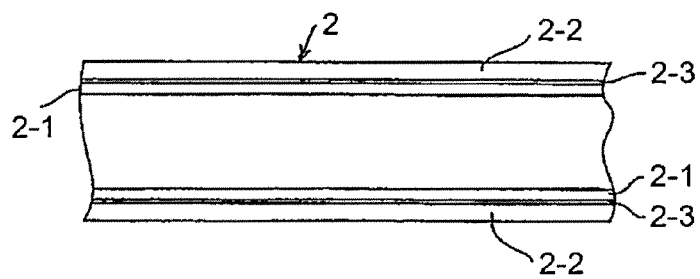
FIG. 13 shows one example of the resin tube manufactured by the extrusion molding device according to the first embodiment.

Referring to FIG. 13, the resin tube manufactured by the extrusion molding device according to the embodiment in FIG. 11 will be described. The resin tube 2 shown in the figure is a tube having a three-layer structure and has a structure comprising a PFA tube 2-1 forming an inner layer tube, a nylon tube 2-2 forming an outer layer tube, and an adhesive layer 2-3 as a second layer which adheres the PFA tube 2-1 and the nylon tube 2-2 by the adhesive layer 2-3.

In this structure, an inner layer is formed by the PFA tube 2-1 of a fluororesin which suppresses gas permeation and which is inactive to ultrapure water, other chemical solutions, and gases and is excellent in durability. However, only by the PFA tube 2-1, gas (oxygen or nitrogen) permeation can not sufficiently be suppressed. Therefore, it is not possible to form a resin tube having desired characteristics.

In view of the above, in the illustrated example, the outer layer tube was formed of nylon which has not been used in a semiconductor manufacturing device of the type. The nylon tube 2-2 and the PFA tube 2-1 were adhered by the adhesive layer 2-3. As a result, as compared to a case of a single-layer PFA tube, an extremely excellent result was obtained. Specifically, it is believed that nylon is unsuitable for a tube for transporting a chemical solution in the semiconductor manufacturing device or the like, because nylon is generally weak against alkali and easily discolored. However, according to an experiment by the present inventors, it is found that nylon is effective in reducing an oxygen permeation amount. Specifically, the PFA tube 2-1 having a thickness of 0.2 mm and the nylon tube 2-2 having a thickness of 0.7 mm were adhered by a fluorine adhesive layer 2-3 having a thickness of 0.1 mm.

Figure 14:
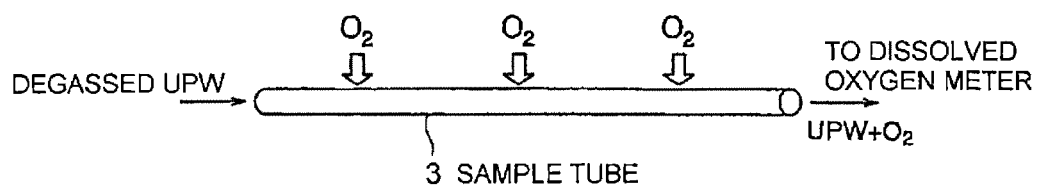
FIG. 14 shows a measurement system which measures characteristics of a tube according to the present invention.

In order to clarify the above-mentioned fact, a measurement result of a permeability coefficient will be described. First, referring to FIG. 14, description will be made of a measurement system for the permeability coefficient, which was used in the experiment related to the present invention. As shown in FIG. 14, a tube which is set as a sample tube 3 is supplied with ultrapure water (UPW) (degassed UPW) through a degassing filter (not shown in the figure). In the measurement system shown in the figure, gas permeation to the sample tube 3 is increased in proportion to a contact area between the gas and the sample tube 3, a contact time, a pressure, and a temperature and is inversely proportional to a thickness. Therefore, a permeation amount per unit time, unit pressure, and unit thickness (permeability coefficient) is calculated by the following formula (1):

$$\text{Permeability Coefficient} = (\text{Amount of Permeating Material} \times \text{Thickness of Sample}) / (\text{Area of Sample} \times \text{Contact Time} \times \text{Pressure difference of Permeating Material}) = (\text{molecules} \cdot \text{cm}) / (\text{cm}^2 \cdot \text{sec} \cdot \text{Pa}) \quad (1)$$

Figures 15, 16:
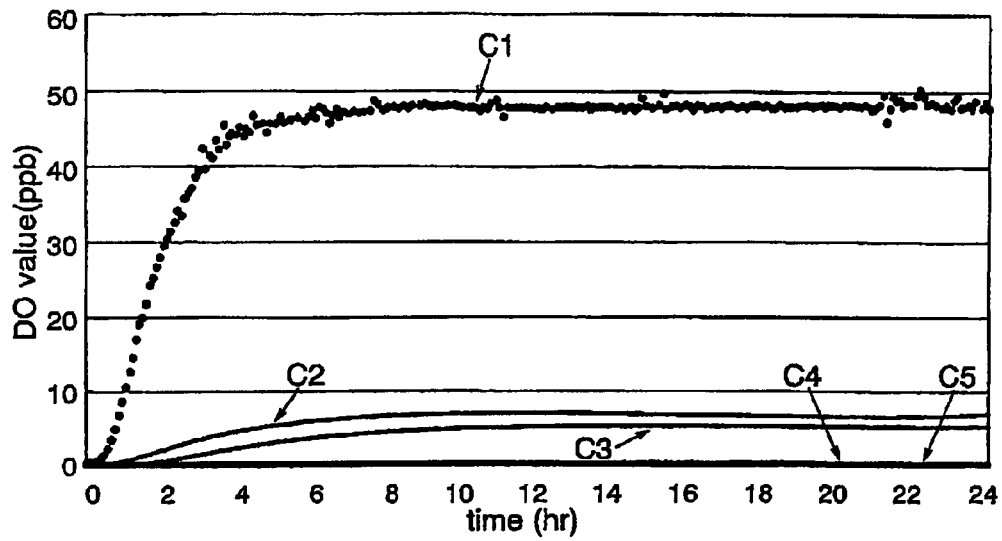
FIG. 15 is a graph showing oxygen permeation amounts measured by using the measurement system shown in FIG. 14.
FIG. 16 shows measurement results obtained by using the measurement system shown in FIG. 14.

FIG. 15 shows measurement results measured by using the measurement system shown in FIG. 14. Herein, each sample tube 3 had an outer diameter of 8 mm, an inner diameter of 6 mm, and a length of 1.5 m. In the illustrated example, measurement results were obtained when UPW at 23° C. flowed at a flow rate of 1 liter/min through the measurement system shown in FIG. 14. Herein, the measurement results of dissolved oxygen (DO) when the sample tube 3 was applied with an oxygen load of 3 $kgf/cm^2$ are shown.

A characteristic curve C1 shown in FIG. 15 represents a permeation amount of a PFA single-layer tube and a characteristic curve C2 represents a variation with time (during 24 hours) of a permeation amount of a nylon single-layer tube.

Further, a characteristic curve C3 represents a permeation amount of a tube which is formed by laminating three layers comprising a PFA layer, an adhesive layer, and a nylon layer in a manner similar to FIG. 13 and which has an outer diameter of 8 mm, an inner diameter of 6 mm, and a length of 1.5 m. A characteristic curve C4 represents a permeation amount of the softened PVDF tube shown in FIG. 12. For reference, a characteristic curve C5 in FIG. 15 represents a permeation amount of a stainless steel tube (SUS) which can not make a flexible tube.

As is clear from FIG. 15 also, both of the softened PVDF tube (C4) and the tube (C3) of a three-layer structure exhibit an oxygen permeation amount not more than 10 ppb even after lapse of 24 hours. It is understood that, as compared to the PFA single-layer tube exhibiting oxygen permeation reaching a level close to 50 ppb, these tubes have an extremely excellent characteristic. It is also understood that, among those tubes, the oxygen permeation amount is smallest in the softened PVDF tube (C4) and, next, is greater in the tube (C3) of the three-layer structure. The softened PVDF tube has the oxygen permeation amount as low as that of the stainless steel tube (SUS).

Next, referring to FIG. 16, measurement values of an oxygen permeability coefficient of the above-mentioned tubes are shown. Herein, an average value during a period from 16 to 20 hours is shown as the dissolved oxygen (DO). Further, in FIG. 16, variation of the dissolved oxygen is depicted by ΔDO where an oxygen amount remaining in UPW is 0.14 ppb. Furthermore, the figure also shows an oxygen permeability coefficient which is calculated by using the following formula (2) disclosed in Patent Document 2.

$$\text{Oxygen Permeability Coefficient (grams·mil/100 in}^2\text{·24 hr·atm)} = (\text{Oxygen Permeation Amount} \times \text{Tube Thickness (mil)})/(\text{Tube Surface Area (100 in}^2) \times \text{Gas ifferential Pressure (atm)}) \quad (2)$$

As is clear from FIG. 16, it is understood that, as compared to an oxygen permeability coefficient ($1.56 \times 10^7$:1.84) of the PFA single-layer tube, both of the three-layer tube and the softened PVDF tube have an extremely low oxygen permeability coefficient (specifically, not more than $10^7$ orders of magnitude). Specifically, the softened PVDF tube and the three-layer tube have the oxygen permeability coefficients of ($1.50 \times 10^5$:0.02), ($1.66 \times 10^6$:0.20), and ($2.14 \times 10^6$:0.25) (unit omitted), respectively, which are not greater than $5 \times 10^6$ [molecules·cm/cm$^2$·sec·Pa]. As compared to the PFA tube, the oxygen permeability coefficients are one digit smaller. Particularly, the softened PVDF tube has the oxygen permeability coefficient which is two digits smaller than that of the PFA tube.

In the examples mentioned above, only the tube comprising a combination of nylon and PFA has been described. However, nylon or PVDF may be combined with another fluororesin, for example, ETFE, PTFE, PVDC, FEP, or the like. In this case, it is preferable to use, as an inner layer tube, a material exhibiting resistance to any one of an alkaline aqueous solution, an acidic aqueous solution, a neutral aqueous solution, and an organic solvent.

Industrial Applicability

The present invention is applicable to all types of resin molding devices for molding a resin tube suitable for transporting a fluid, such as ultrapure water (UPW), a chemical solution, or the like for use in production lines for a semiconductor or other electronic devices. The tube according to the present invention is applicable not only to a tube between containers but also to a tube for supplying a chemical solution, transporting ultrapure water, or the like.

The invention claimed is:

1. A resin molding device which molds a resin tube from a molten resin, comprising:
   a heating cylinder;
   a screw disposed in the heating cylinder;
   a hopper; and
   a storage tank storing a resin material, and configured to transport the resin material to the hopper through a transport line,
   wherein all parts of the storage tank, the hopper, and the heating cylinder, which are associated with the resin material, including the transport line of the resin material, are formed into a sealed-type structure under a N$_2$ gas atmosphere, and
   wherein the resin molding device comprises a jig which defines inner and outer diameters of the resin tub;
   wherein the heating cylinder is formed with a molten resin extruding portion at an end portion thereof,
   wherein the resin molding device further comprises a tube molding portion connected to the molten resin extruding portion through an insulating material to define an outer diameter of the resin tube, and a spindle member inserted into the tube molding portion and extending to a position near an exit of the tube molding portion to define an inner diameter of the resin tube, the tube molding portion and the spindle member collectively serving as the jig,
   wherein a tubular casing is attached to an end portion of the tube molding portion to cover a periphery of the resin tube coming out from the tube molding portion, a N$_2$ gas being introduced into the tubular casing, and
   wherein the tube molding portion comprises a cylinder member wherein the tubular casing is connected, and a cooling portion is provided around the cylinder member.

2. The resin molding device as claimed in claim 1, wherein at least a part of the jig, which is to be brought into contact with the molten resin, is formed of a heat-resistant material having a low catalytic effect which does not accelerate decomposition of the molten resin.

3. The resin molding device as claimed in claim 1, wherein the jig comprises control means which controls an atmosphere of a hollow portion of the resin tube so that oxygen of not more than 0.1 wt % and moisture of not more than 0.1 wt % are contained.

4. The resin molding device as claimed in claim 1, comprising control means which controls an atmosphere of any area where the molten resin and a raw material of the molten resin are present, including an area associated with the resin molding device, so that oxygen of not more than 0.1 wt % and moisture of not more than 0.1 wt % are contained.

5. The resin molding device as claimed in claim 2, wherein all parts to be brought into contact with the molten resin are formed of a heat-resistant material having a low catalytic effect which does not accelerate decomposition of the molten resin.

6. The resin molding device as claimed in claim 2, wherein the heat-resistant material is formed of at least one of Al$_2$O$_3$, Cr$_2$O$_3$, Ni, NiF$_2$, and hastelloy.

7. The resin molding device as claimed in claim 1, further comprising a first resin reservoir which stores a predetermined amount of the molten resin and first extruding or extracting means which extracts the molten resin from the first resin reservoir and forms a resin tube while defining inner and outer diameters by the jig.

8. The resin molding device as claimed in claim 7, further comprising, on a downstream side in an extruding or extracting direction, a second resin reservoir which stores a predetermined amount of a second molten resin and second extruding or extracting means which extracts the second molten resin from the second resin reservoir and laminates the second molten resin so as to cover an outside of the resin tube formed by the first extruding or extracting means.

* * * * *

UNITED STATES PATENT AND TRADEMARK OFFICE
CERTIFICATE OF CORRECTION

PATENT NO. : 8,562,320 B2  Page 1 of 1
APPLICATION NO. : 12/450341
DATED : October 22, 2013
INVENTOR(S) : Ohmi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 705 days.

Signed and Sealed this

Fifteenth Day of September, 2015

Michelle K. Lee
*Director of the United States Patent and Trademark Office*